No. 890,852.  
PATENTED JUNE 16, 1908.  
W. ELLINGEN.  
CARRIAGE FOR ROPEWAYS.  
APPLICATION FILED JAN. 28. 1908.
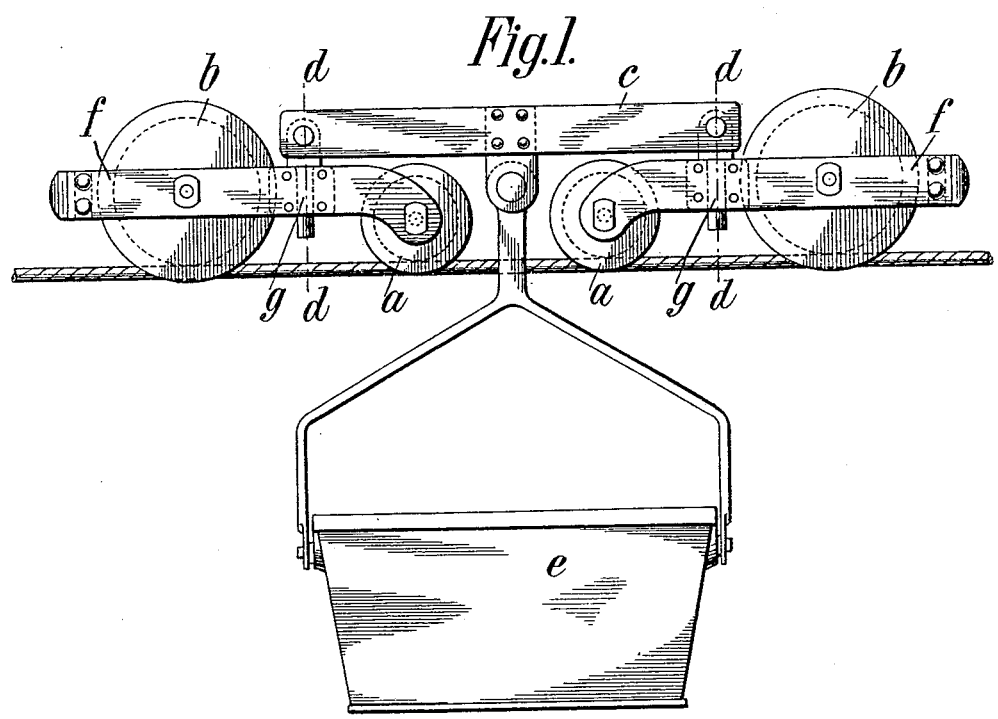
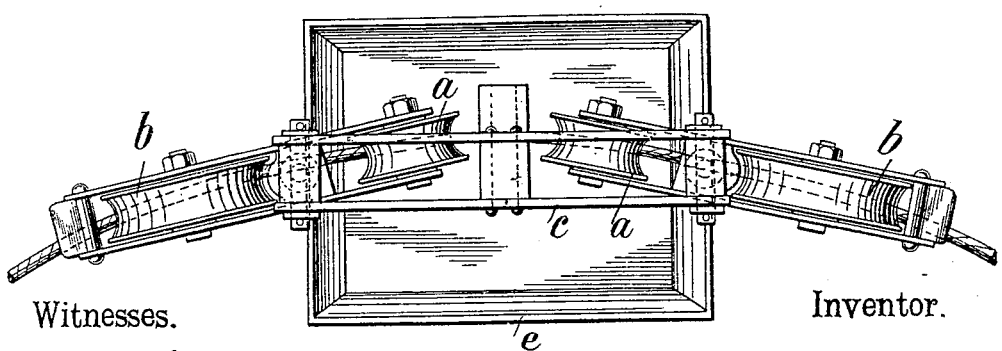
Witnesses.  
Jesse N. Lutton.  
B. V. Sommers
Inventor.  
Wilhelm Ellingen.  
by Henry Orth Jr.  
Atty.

UNITED STATES PATENT OFFICE.

WILHELM ELLINGEN, OF COLOGNE-LINDENTHAL, GERMANY.

CARRIAGE FOR ROPEWAYS.

No. 890,852.  Specification of Letters Patent.  Patented June 16, 1908.

Application filed January 28, 1908. Serial No. 413,109.

*To all whom it may concern:*

Be it known that I, WILHELM ELLINGEN, a subject of the King of Prussia, residing at Cologne-Lindenthal, Germany, have invented certain new and useful Improvements in Carriages for Ropeways; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to carriages for ropeways. Heretofore carriages for rope-ways having a plurality of trucks connected by a bolster or other suitable devices from which the load is suspended have been of such a nature that guard rails could not be placed above any of the wheels of the carriage.

The object of the present invention is to so construct a carriage that one or more of its wheels extend above the bolster or load supporting devices in order that such wheels may coöperate with guard rails properly positioned above them.

Referring to the drawings in which like parts are similarly designated, Figure 1 is a side view of the carriage showing the load supporting bucket suspended from the center thereof. Fig. 2 is a plan of the carriage.

As shown in the drawing, the carriage is composed of two trucks $f$ each provided with a large grooved wheel $b$ and a small grooved wheel $a$ both engaging the carrier rope of the way. Between the two wheels of each truck is a bearing $g$. The two trucks are connected by a bolster $c$ pivoted near or at its ends on the lines $d$—$d$ in the bearings of the respective trucks. This bolster $c$ extends over the small wheels $a$ which are directed towards the center, but lies below the tops of the larger wheels $b$. From the middle of the bolster the load supporting bucket $e$ or other device is suspended in the customary manner. It will be noticed that the ends of the trucks $f$ that carry the small wheels $a$ are conveniently turned downward so as to lower the centers of these wheels $a$ as much as possible. The bearings $g$ are preferably so located with respect to the centers of the two wheels in each truck that the load supported by these bearings is equally distributed between the two wheels.

I claim:

1. A rope-way carriage comprising a plurality of trucks, wheels of different diameters mounted in said trucks and a bolster connecting the trucks and below the upper edges of the larger wheels.

2. A rope-way carriage comprising a plurality of trucks, wheels mounted in said trucks, the wheels in one of the trucks of different diameter, a bolster pivotally connecting the trucks and lying below the upper edge of the wheel of largest diameter.

3. A rope-way carriage comprising two trucks, two wheels of different diameter mounted in each of said trucks, a bolster connecting said trucks and extending over the smaller wheels and below the plane of the upper edge of the larger wheels.

In testimony that I claim the foregoing as my invention, I have signed my name in presence of two subscribing witnesses.

WILHELM ELLINGEN.

Witnesses:
BESSIE L. DUNLAP,
WM. VANDORY.